US007998455B2

(12) United States Patent
Abbas et al.

(10) Patent No.: US 7,998,455 B2
(45) Date of Patent: Aug. 16, 2011

(54) PROCESS FOR HYDROGEN GAS PRODUCTION FROM CARBOHYDRATE FEEDSTOCKS

(75) Inventors: Charles A. Abbas, Champaign, IL (US); Thomas P. Binder, Decatur, IL (US); Leif P. Solheim, Decatur, IL (US); Mark Matlock, Decatur, IL (US)

(73) Assignee: Archer Daniels Midland Company, Decatur, IL (US)

( * ) Notice: Subject to any disclaimer, the term of this patent is extended or adjusted under 35 U.S.C. 154(b) by 273 days.

(21) Appl. No.: 11/985,406

(22) Filed: Nov. 15, 2007

(65) Prior Publication Data

US 2008/0118429 A1    May 22, 2008

Related U.S. Application Data

(60) Provisional application No. 60/859,443, filed on Nov. 16, 2006.

(51) Int. Cl.
*C01B 3/02*    (2006.01)
*C01B 3/24*    (2006.01)

(52) U.S. Cl. .................................... 423/648.1; 423/650

(58) Field of Classification Search ................ 423/648.1
See application file for complete search history.

(56) References Cited

U.S. PATENT DOCUMENTS

| | | | | |
|---|---|---|---|---|
| 3,823,227 | A * | 7/1974 | White ............................ | 423/655 |
| 5,651,953 | A * | 7/1997 | Yokoyama et al. ........ | 423/648.1 |
| 6,291,725 | B1 | 9/2001 | Chopade et al. | |
| 6,887,692 | B2 * | 5/2005 | Paterek ......................... | 435/168 |
| 6,964,758 | B2 * | 11/2005 | Cortright et al. ........... | 423/648.1 |
| 2005/0108941 | A1 | 5/2005 | Nielsen et al. | |
| 2005/0239182 | A1 * | 10/2005 | Berzin ......................... | 435/166 |
| 2006/0069274 | A1 * | 3/2006 | Dias De Moraes E Silva et al. .............................. | 554/174 |
| 2006/0185246 | A1 * | 8/2006 | Hanus et al. .................... | 48/209 |

FOREIGN PATENT DOCUMENTS

WO    WO 2004/052813 A1    6/2004

OTHER PUBLICATIONS

Solaiman et al. "Bioconversion of Soy-Based Feedstocks into Biopolyers and Biosurfactants", Annual Meeting and Expo of the American Oil Chemists' Society, p. 14, Apr. 30, 2006 (abstract).
Llorca, J. et al. "Effect of sodium addition on the performance of Co-ZnO-based catalysts for hydrogen production from bioethanol." Journal of Catalysis (2004) 222: 470-480.
Breen, J.P. et al. "Metal-catalysed steam reforming of ethanol in the production of hydrogen for fuel cell applications." Applied Catalysis B; Environmental (2002) 39:65-74.
International Polyol Chemicals, Inc. "Polyols from Sorbitol", Jan. 8, 1999.
Minowa, T. et al., "Hydrogen Productionfrom Biomass by Catalytic Gasification in Hot Compressed Water", Renewable Energy 16 (1999) 1114-1117.
Usui, Y. et al., "Selective Hydrogen Production from Cellulose at Low Temperature Catalyzed by Supported Group 10 Metal", Chemistry Letters, (2000) 1166-1167.
Sakata, T. et al. "Hydrogen Production from Biomass and Water by Photocatalytic Processes", Nouvelle Journal de Chimie (1981) 279-281.
PCT/US2007/023798 International Search Report dated Apr. 29, 2008.
Wang, D. et al. "Production of Hydrogen from Biomass by Catalytic Steam Reforming of Fast Pyrolysis Oils" Energy & Fuels (1998) 12:19-24.
Garcia, L. et al. Catalytic Steam Gasification of Pine Sawdust. Effect of Catalyst Weight/Biomass Flow Rate and Steam/Biomass Ratios on Gas Production and Composition. Energy & Fuels (1999) 13:851-859.
Wang, D. et al."Biomass to Hydrogen via Fast Pyrolysis and Catalytic Steam Reforming of the Pyrolysis Oil or Its Fractions" Ind. Eng. Chem. Res. (1997) 36:1507-1518.
Aznar, M.P. et al. "Improved Steam Gasification of Lignocellulosics Residues in ca Fluidized Bed with Commercial Steam Reforming Catalysts." Ind. Eng. Chem. Res. (1993) 32:1-10.
Turn, S. et al. "An Experimental Investigation of Hydrogen Production From Biomass Gasification." Int. J. Hydrogen Energy (1998) 23:641-648.
Rapagna, S. et al. "Catalytic Gasification of Biomass to Produce Hydrogen Rich Gas." Int. J. Hydrogen Research (1998) 23:551-557.
Asadullah, M. et al. "Energy Efficient Production of Hydrogen and Syngas from Biomass: Development of Low-Temperature Catalytic Process for Cellulose Gasification." (2002) 36:4476-4481.
Jacobsen, H. "Heterogeneous Chemistry: Catalysts for Hydrogen Production from Biomass." (2004) 43:1912-1914.
Rapagna, S. et al. "Development of catalysts suitable for hydrogen or syn-gas production from biomass gasification." Biomass & Bioenergy (2002) 22:377-388.
Garcia, L. et al. "Catalytic steam reforming of bio-oils for the production of hydrogen: effects of catalyst composition." Applied Catalysis A: General (2000) 201: 225-239.
Chen, G. et al. "Catalytic pyrolysis of biomass for hydrogen rich fuel gas production." Energy Conversion and Management (2003) 44:2289-2296.
Fatsikostas A. N. et al. "Steam reforming of biomass-derived ethanol for the production of hydrogen for fuel cell applications". Chem. Commun. (2001) 851-852.
French, R. et al. "Fluidizable catalysts for hydrogen production hydrogen; Hydrogen from steam biomass pyrolysis products". (2002) 47(2):759-760.

* cited by examiner

*Primary Examiner* — Melvin C Mayes
*Assistant Examiner* — Kenneth Vaden

(57)    ABSTRACT

A method for producing hydrogen from a plant source is disclosed. The method includes contacting a crude carbohydrate material obtained from the plant source with water and a catalyst at a temperature and pressure sufficient to decompose at least a portion of the crude carbohydrate material to form a vapor mixture of gases including hydrogen, and separating hydrogen from other gases present in the vapor mixture.

17 Claims, No Drawings

PROCESS FOR HYDROGEN GAS PRODUCTION FROM CARBOHYDRATE FEEDSTOCKS

CROSS-REFERENCE TO RELATED APPLICATION

This application is a utility application and claims the benefit of priority to U.S. Provisional Patent Application Ser. No. 60/859,443, filed on Nov. 16, 2007, entitled "Process For Hydrogen Gas Production From Carbohydrate Feedstocks", having the same named applicants as inventors, namely, Charles A. Abbas, Thomas P. Binder, Leif P. Solheim, and Mark Matlock. The entire contents of U.S. Provisional Patent Application Ser. No. 60/859,443 is incorporated by reference into this utility patent application.

FIELD OF THE INVENTION

The present invention relates to the field of hydrogen production, particularly to novel processes and materials for hydrogen production, more particularly to producing hydrogen from byproduct streams from processing of agricultural productions.

BACKGROUND OF THE INVENTION

The following Background includes information that may be useful in understanding the present inventions. It is provided as an aid to understanding the utility of the invention and background information that is incorporated by reference to the extent needed to practice the invention. Information provided in this Background section may form part of the present invention and its presence in this section is not an admission that the information is prior art to the claimed inventions, or that any publication or document that is specifically or implicitly referenced is prior art.

Hydrogen is an important feedstock for the manufacture of chemicals and as a clean fuel in combustion engines and in fuel cells (Garcia et al. 2000). It finds uses in activities such as the manufacture of fertilizers, petroleum processing, methanol synthesis, annealing of metals and producing electronic materials. In the foreseeable future emergence of fuel cell technology will extend the use of hydrogen to domestic and vehicle applications. The primary synthetic routes for the production of hydrogen have consisted of catalytic steam reforming of methane, C2-C4, natural gas, LPG (liquefied petroleum gas), naphtha or other light hydrocarbons. Other routes have reportedly used the partial oxidation of heavy oil residues and coal gasification from these starting materials. Increased interest in fuel hydrogen production requires the development of economically and environmentally sustainable processes that compete with processes involving derivation of hydrogen gas from hydrocarbons obtained from petrochemical and natural gas sources. The world's supply of petroleum is being depleted at an increasing rate. Eventually, demand for petrochemical derived products will outstrip the supply of available petroleum. When this occurs, the market price of petroleum and, consequently, petroleum derived products will likely increase, making products derived from petroleum more expensive and less desirable. As the available supply of petroleum decreases, alternative sources and, in particular, renewable sources of comparable products will necessarily have to be developed. One potential renewable source of petroleum derived products is products derived from bio-based matter, such as agricultural and forestry products. Use of bio-based products may potentially counteract, at least in part, the problems associated with depletion of the petroleum supply.

In an effort to diminish dependence on petroleum products the United States government enacted the Farm Security and Rural Investment Act of 2002, section 9002 (7 U.S.C. 8102), hereinafter "FRISA", which requires federal agencies to purchase bio-based products for all items costing over $10,000. In response, the United States Department of Agriculture ("USDA") has developed Guidelines for Designating Bio-based Products for Federal Procurement (7 C.F.R. §2902) to implement FRISA, including the labeling of bio-based products with a "U.S.D.A. Certified Bio-based Product" label.

Biology offers an attractive alternative for industrial manufacturers looking to reduce or replace their reliance on petrochemicals and petroleum derived products. The replacement of petrochemicals and petroleum derived products with products and/or feed stocks derived from biological sources (i.e., bio-based products) offer many advantages. For example, products and feed stocks from biological sources are typically a renewable resource. As the supply of easily extracted petrochemicals continue to be depleted, the economics of petrochemical production will likely force the cost of the petrochemicals and petroleum derived products to higher prices compared to bio-based products. In addition, companies may benefit from the marketing advantages associated with bio-derived products from renewable resources in the view of a public becoming more concerned with the supply of petrochemicals.

Renewable lignocellulosic biomass feedstocks represent alternative feedstocks for the production of hydrogen. Recent developments in this area have reported the use of renewable carbohydrate feedstocks that are derived from dilute sugar streams and lignocellulosics (i.e. soft and hardwoods, crop residues such as straws, hulls, and/or fibers) to produce hydrogen using thermochemical processes such as pyrolysis and/or gasification. It has been reported by Cortright, et al., U.S. Pat. No. 6,699,457, that a substantial amount of hydrogen production is performed by steam reforming of hydrocarbons according to the formula:

$$C_xH_{2x+2} + xH_2O \rightarrow xCO + (2x+1)H_2 \quad (1)$$

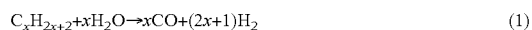

As discussed in Cortright, et al., this reaction may be carried out in the presence of a catalyst, for instance a nickel-based catalyst on a modified alumina support. Cortright et al. further report the use of subsequent water-gas shift reactions to create hydrogen gas from the carbon monoxide produced as a byproduct of the hydrocarbon reformation. Cortright, et al., U.S. Pat. No. 6,699,457, is incorporated by reference as if fully rewritten herein.

Hydrogen production from starch-derived products such as polyols (for example, sorbitol) or ethanol have also been proposed. For instance, Cortright, et al. report production of hydrogen by reforming of oxygenated hydrocarbon feedstock. The Cortright, et al. method purportedly includes reaction of water and a water-soluble oxygenated hydrocarbon (or hydrocarbons) having at least two carbon atoms in the presence of a catalyst containing a metal from the Group VII transition metals or their alloys.

The reaction proposed in Cortright et al. purportedly proceeds initially according to the following equation:

$$C_xH_{2y}O_x \rightarrow nCO + yH_2 \quad (2)$$

The carbon monoxide produced in that reaction is then subjected to the water-gas shift reaction:

$$CO + H_2O \rightarrow CO_2 + H_2 \quad (3)$$

In the steam reforming according to reaction equation (3) the steam is used in excess. The so-called "steam to carbon ratio" (S/C) is used to characterize the excess water that is used. Normally a value for S/C of between 1.2 and 2.0 is chosen. In the case of the reforming of methanol S/C is identical to the molar ratio of water to methanol. For use in fuel cells gas mixtures are required that have a low carbon monoxide content with a high hydrogen content, since carbon monoxide deactivates the anode catalyst at which the oxidation of the fuel takes place. Normally amounts of carbon monoxide in the fuel of below 100 ppm, preferably less than 10 ppm, are required. If the fuel is obtained by reforming methanol, this requirement can at the present time only be met by a subsequent purification of the reformate gas. The effort and expenditure involved are less the lower the carbon monoxide content in the reformate gas. For use in vehicles, for reasons of space and weight reforming catalysts are required that has a very high specific hydrogen productivity and a high selectivity, the selectivity of the formation of carbon dioxide being used to characterize the selectivity of the steam reforming. Cortright et al. reports the use of a number of starting materials for the oxygenated hydrocarbon process reported in the '457 patent, including "ethanediol, glycerol, sorbitol, glucose, and other water-soluble carbohydrates." They claim that use of these starting materials allows them to perform their process at a lower temperature than other processes having an equivalent result.

Some hydrogen-production processes report the use of polyols as starting materials. To improve or enable polyol production, a number of catalysts have been suggested for hydrogenation and hydrogenolysis. These include, for example, ruthenium silica, cobalt-zinc based catalysts, and various metal catalysts such as alumina, nickel, platinum, palladium, and rhodium.

Other methods, apparatuses, and catalysts for hydrogen production are reported in the following publications, all of which are incorporated by reference herein. Wang, D. et al. "Production of Hydrogen from Biomass by Catalytic Steam Reforming of Fast Pyrolysis Oils" *Energy & Fuels* (1998) 12:19-24; Garcia, L. et al. "Catalytic Steam Gasification of Pine Sawdust. Effect of Catalyst Weight/Biomass Flow Rate and Steam/Biomass Ratios on Gas Production and Composition" *Energy & Fuels* (1999) 13:851-859; Wang, D. et al. "Biomass to Hydrogen via Fast Pyrolysis and Catalytic Steam Reforming of the Pyrolysis Oil or Its Fractions" *Ind. Eng. Chem. Res.* (1997) 36:1507-1518; Aznar, M. P. et al. "Improved Steam Gasification of Lignocellulosics Residues in ca Fluidized Bed with Commercial Steam Reforming Catalysts" *Ind. Eng. Chem. Res.* (1993) 32:1-10; Turn, S. et al. "An Experimental Investigation of Hydrogen Production From Biomass Gasification" *Int. J. Hydrogen Energy* (1998) 23:641-648; Rapagna, S. et al. "Catalytic Gasification of Biomass to Produce Hydrogen Rich Gas" *Int. J. Hydrogen Research* (1998) 23:551-557; Asadullah, M. et al. "Energy Efficient Production of Hydrogen and Syngas from Biomass: Development of Low-Temperature Catalytic Process for Cellulose Gasification" (2002) 36:4476-4481; Jacobsen, H. "Heterogeneous Chemistry: Catalysts for Hydrogen Production from Biomass" (2004) 43:1912-1914; Rapagna, S. et al. "Development of catalysts suitable for hydrogen or syn-gas production from biomass gasification" *Biomass & Bioenergy* (2002) 22:377-388; Garcia, L. et al. "Catalytic steam reforming of bio-oils for the production of hydrogen: effects of catalyst composition" *Applied Catalysis A: General* (2000) 201: 225-239; Chen, G. et al. "Catalytic pyrolysis of biomass for hydrogen rich fuel gas production" *Energy Conversion and Management* (2003) 44:2289-2296; Fatsikostas, A. N. et al. "Steam reforming of biomass-derived ethanol for the production of hydrogen for fuel cell applications" *Chem. Commun.* (2001) 851-852; French, R. et al. "Fluidizable catalysts for hydrogen production hydrogen; Hydrogen from steam biomass pyrolysis products" (2002) 47(2):759-760; Llorca, J. et al. "Effect of sodium addition on the performance of Co—ZnO-based catalysts for hydrogen production from bio-ethanol" *Journal of Catalysis* (2004) 222: 470-480; Breen, J. P. et al. "Metal-catalysed steam reforming of ethanol in the production of hydrogen for fuel cell applications" Applied Catalysis B; Environmental (2002) 39:65-74; Arndt, J-D. et al. "Continuous method for the production of sugar alcohols" WO 2004/052813 A1 (2004).

Although a number of processes and starting materials for production of hydrogen and/or syn gases have been suggested many involve use of starting materials that are expensive to produce, or that could more economically be used to produce other products. There remains a need in the art for more economic feedstreams for production of hydrogen.

BRIEF SUMMARY OF THE INVENTION

The inventions described and claimed herein have many attributes and encompass many embodiments including, but not limited to, those set forth in this Summary.

One aspect of the present disclosure is to provide a process or processes for the production of hydrogen and/or syn gases that use novel starting materials that may be inexpensive, effective, and easily transportable and/or accessible.

In one aspect there is disclosed a process for production of hydrogen that includes starting materials that include sugar streams derived from crops such as corn, soybeans, wheat, oats, rye, millet, barley, sorghum, triticale, sugar beets, sugarcane, and rice, and grain-like plants such as amaranth and buckwheat.

In a further aspect, there is disclosed use of starch components from corn and wheat or other starchy grains or tubers to prepare a saccharified slurry of glucose, maltose, dextrins, or their byproduct liquors, crystalline fructose liquors, pyrodextrin production byproduct streams, industrial starch manufacturing byproducts, and other byproduct starch containing streams from wheat or other starchy grains/tubers. This slurry is then used to produce hydrogen gas by a process that will be recognized by those skilled in the art. For instance, the process reported by Cortright, et al. may be used with these starting materials.

The present teaching differs from Cortright, et al. in a number of respects. For example, it incorporates process information and multiple sources of inexpensive starting materials and fibers that are currently sold for their animal feed value. These streams can result in significant reduction in feedstock cost and can thereby improve the economics of H2 production. The present disclosure takes advantage, in some embodiments, of a pretreatment and hydrolysis step that yields a mixture of polyols that can be used as starting material. Depending on the type and severity of the conditions employed in the pretreatment and hydrolysis step, a clean up step that combines a pH adjustment step, ion exchange, carbon treatment and/or filtration/ultrafiltration may be used to insure that the feedstock is compatible with catalysts employed in the H2 production step. Those skilled in the art will, with the benefit of this disclosure, recognize the utility of contacting a polyol in the presence of a metal-containing catalyst, preferably an inexpensive metal-containing catalyst.

In a still further aspect, there is disclosed use of sorbitol liquor or high-fructose syrup or a byproduct streams made of the above as starting materials. In a more general aspect, the starting material for production of hydrogen gas is a sugar stream of sugars such as hexose, pentose, or their oligomers and waste streams derived therefrom. These may include, for example, the dextrin stream byproduct from pyrodextrin production process or the byproduct streams from dextrose refining operations. Such streams may include "dextrose greens" which are mother liquors from which crystalline dextrose has been recovered, but which contain additional, residual dextrose value that cannot now be economically recovered. The sugar stream may be derived, for example, from corn fiber hulls, corn gluten feed, distillers dried grains, soybean hulls, wheat straws, corn stover, cocoa hulls, oat hulls, barley hulls, or mixtures including one or more of the same. These starting materials may be hydrolyzed and hydrogenolyzed (catalytically or not) to produce hydrogen and syn gases. Syn gas is primarily a mixture of carbon monoxide and hydrogen.

In another aspect, the starting material is a soy molasses liquor. In a yet further aspect, the starting material is a glycerol obtained as a byproduct from the use of vegetable oil to produce biodiesel.

DETAILED DESCRIPTION OF THE INVENTION

I. Definitions

As used herein, "corn fiber" is a product obtained from a corn wet-milling process, which involves an initial steeping of corn kernels in an aqueous media, typically aqueous sulfur dioxide, at an elevated temperature followed by gentle grinding and physical separation of the outer fiber layers from starch (endosperm), protein and other components.

As used herein, "corn steep liquor" is a liquid that is derived from the initial steeping of the corn kernels in wet-milling.

As used herein, "stillage" is the bottoms from the distillation of an ethanol fermentation broth in a wet-milling process.

As used herein, "corn gluten feed" is a relatively low value by-product stream of the wet-milling process containing a mixture of carbohydrates and protein that is customarily sold as animal feed.

As used herein, "slurry" is a suspension of grain components in water.

As used herein, the term "bio-derived" means derived from or synthesized by a renewable biological feedstock, such as, for example, an agricultural, forestry, plant, bacterial, or animal feedstock. The term "bio-based" means a product that is composed, in whole or in significant part, of biological products or renewable agricultural materials (including plant, animal and marine materials) or forestry materials. Similarly, the term "petroleum derived" means a product derived from or synthesized from petroleum or a petrochemical feedstock.

As used herein, "crude carbohydrate material" means an unrefined composition obtained from a plant source containing a mixture of carbohydrates (including polyols) of different structures, different sizes, or with different substituent groups. The crude carbohydrate material may also contain non-carbohydrate components typically found in plants, for example, lignins, lipids, proteins and the like. Typically a crude carbohydrate material is byproduct stream from an agricultural processing facility engaged in the production of principle products from crop materials. Examples of such byproduct streams include, but are not limited to, corn fiber, corn glutten, soy molasses, soy hulls, mixed polyol fractions, dextinized starch, cellulosic and hemicellosic enriched fractions, and the like.

II. Starting Materials

The Processes described herein use of one or more of a number of starting materials. These include, for example, soy molasses, vegetable oil by-products, sugar streams from fibers, and slurries of grain starch. Examples of these are described below.

A. Starch from Corn and/or Wheat, in a Slurry

In one embodiment, a grain fiber, for example a corn fiber or a wheat bran fiber, is separated from starch, which is placed into a slurry for hydrogen formation. Starch may be obtained, for example, from a corn dry milling process, or other starchy grains and tubers may be used. An exemplary corn dry milling process is described in Singh, et al. "Modified Dry Grind Ethanol Process," Publication of the Agricultural Engineering Dept. of Univ. of Ill. and Urbana-Champaign, UILU No. 2001-7021, Jul. 18, 2001, which is incorporated by reference herein. Corn dry milling (without ethanol production) typically involves addition of water to the corn kernel. This addition of water tends to make germ more resilient due to differential swelling relative to the other kernel components. The corn is treated (by abrasion or grinding) to break the kernel into pericarp (bran), germ, and endosperm fragments. After drying, the pericarp and germ fragments are removed from the endosperm by sifting, aspiration, or other means known to those skilled in the art. The starch could be liquefied via heat, enzymatic, or acid treatment prior to treatment with the beta-amylase enzyme. Preferably, the starch is liquefied via acid treatment, although low amylose starches may require liquefaction only with heat and may be suitably liquefied at the operating temperature of the enzymatic hydrolysis. The may then be diluted with water again to form a saccharified slurry of glucose, maltose, dextrins, or their byproduct liquors. "Saccharified slurry" as used here in refers to a mixture of dextrins, which are short oligosaccharides obtained from hydrolysis of starch and may further contain carbohydrates of DP8 or smaller, amino acids, proteins and other by products of cereal processing that provide a carbohydrate feedstock for hydrogen production.

B. Soy Molasses

Soy molasses is a low-cost starting material that may be used in the production of hydrogen gas. Soy molasses liquor is a by-product of soybean processing (in particular, the extraction of soybean oil) derived from an aqueous ethanol extract of hexane-defatted soybean flakes. The defatted soybean flakes are extracted with aqueous ethanol (approximately 60-80% ethanol by volume) at temperatures in the range of about 44°-63° C. (1200-150° F.) to remove ethanol, as described in U.S. Pat. No. 6,033,714, to Gugger, et al., (assigned to Archer Daniels Midland Company), which is incorporated by reference herein. Soy molasses may contain, for example, the sugars dextrose, galactose, sucrose, fructose, pinitol, raffinose, verbascose, melibiose, and stachyose. It may be obtained, for example, by washing soy flakes or soy flour with water at a pH of between about 4.2 to 4.6. The soy molasses stream (referred to also as MR concentrate or MRC) can be optionally treated to digest stachyose, raffinose, sucrose, and melibiose using enzymes that consist of a mixture of invertase and a galactosidase to the C6 sugars fructose, glucose, and galactose. The example given illustrates this with a starting feedstocks of 25% dry solids that is subjected to enzyme digestion at 50° C. in a reactor for 16-18 hrs at a pH of 5.0, followed by dilution to a 17.5% dry solid stream that can be used as a feedstock to a gasifier. Table I below list some properties of the sugar content of soy molasses before and after enzyme treatment.

TABLE 1

| Sample Id | ppm stachyose | ppm raffinose | ppm sucrose | ppm fructose | ppm galactose | ppm glucose |
|---|---|---|---|---|---|---|
| 25% solids MRC | | | | | | |
| Pre-enzyme | 33,226 | 6,905 | 40,429 | 13,506 | 836 | 9,142 |
| 17.5% solids MRC | | | | | | |
| Post Enzyme | 430 | 136 | 0 | 29,571 | 18,707 | 29,235 |

C. Fiber Starting Materials

In a further aspect, the starting material for production of hydrogen gas is a sugar stream of sugars such as hexoses, pentoses, or their oligomers. The sugar stream may be derived, for example, from corn fiber hulls, corn gluten feed, distillers dried grains, soybean hulls, wheat straws, corn stover, cocoa hulls, rice hulls, cottonseed gins, oat hulls, barley hulls, and including the same. These sugars can also be derived from sugarcane bagasse, sugar beet pulp fiber containing streams or other fibers derived from processing of starchy tubers such as cassava or sweet potatoes.

Although the present teaching is not limited to these starting materials, the chemical composition of some starting materials for processes of the invention are listed in Tables 1 and 2.

Lignocellulosic hydrolysates contain a mixture of C5/C6 sugars that are not readily fermented by yeast. Recombinant ethanolgens often ferment these sugars poorly or at much reduced productivity as compared to glucose derived from starch. Carrying out a rapid ethanol fermentation and using the fermentation liquor as is or following separation of solids, represents an attractive route to hydrogen production.

III. Processes for Hydrogen Gas Production

Certain embodiments provide methods for production of hydrogen gas and syn fuel from byproduct fiber streams entails a thermochemical step at between 135-225° C. This step solubilizes a mixture of sugars that vary include monomers/dimmers/oligomers. This is followed by a liquid-solid separation step to recover the liquid and solids. The liquid is further subjected to a gasification a step at elevated temperatures (typically >225° C. and preferably >450° C.) in presence of a commercial metal catalyst to produce a syn gas that includes H2 and CO. Solids separated in the first step can be also treated at elevated temperatures (preferably at temperatures >550° C.) to obtain syn gas, or in a two step process that converts solids in a gasification step at temperatures between 225-550° C. (preferably between 450-550° C.) first to a liquid or bio-oil with yields that exceed >75% by weight followed by a catalytic steam reforming step.

TABLE 2

| | Cellulose | Hemicellulose | Starch | Fat | Ash | Protein | Lignin | Pectin | Mucilage & Gums | Total |
|---|---|---|---|---|---|---|---|---|---|---|
| Rice Hulls | 30 | 20 | | 0.8 | 16.3 | 3.2 | 21.4 | | | 91.7 |
| Soybean Hulls | 46 | 18 | | 2.5 | 5 | 12 | 2 | | | 85.5 |
| Corn Fiber Hulls | 16 | 40 | 18 | 3 | 3 | 11 | 4 | | | 95 |
| Distillers Dried Grains | 24 | 26 | | 10 | 2.5 | 28 | 4 | | | 94.5 |
| Cocoa Shells | 13.7 | 7.1 | | 3.4 | 8.25 | 15.3 | | 8 | 9 | 64.75 |
| Edible Bean Solid Byproducts | | | | | | | | | | |
| Cottonseed Hulls | 59 | | | 1.4 | | | 24 | | | 83 |
| Oat Hulls | 30 | 36 | | | 3.6 | | 13.2 | | | 84.2 |
| Wheat Bran | 13.6 | 29.3 | | | 5.9 | 15.7 | | | | 64.5 |

D. Vegetable Oil Byproducts

Biodiesel is the generic term for the mono-alkyl esters of fatty acids derived from animal fats or vegetable oils. Biodiesel may be produced, for instance, by reaction of soybean oil with methanol in the presence of a catalyst. A catalyst may be, for example, sodium hydroxide or potassium hydroxide. Biodiesel production results in glycerol as a byproduct.

Glycerol is a useful starting material for production of hydrogen and syn gas. For example, glycerol produced as a byproduct of the reaction of soybean oil with methanol in the presence of sodium hydroxide may be purified and used as a starting material in the process described in U.S. Pat. No. 6,699,457, to Cortright, et al.

Ethanol or a fermentation liquor containing ethanol can also be used as a starting material to produce syn gas. The economics of production and recovery of ethanol from dilute lignocellulosic feedstocks pose a major obstacle to the commercial production of ethanol from biomass hydrolysates.

In another embodiment the whole slurry obtained from a thermochemical pretreatment step (performed at 135-225° C. for 10-30 minutes) is further subjected to gasification step to a bio-oil without a liquid-solid separation step. The treated material is further subjected to elevated temperatures (>225° C. and preferably between 450-550° C.) in presence of a catalyst to derive syn gas. Application of elevated temperatures in the presence of a catalyst may be conducted over a period ranging from about 15 seconds to about 5 minutes.

The conversion of oxygenated containing biomass lignocellulosic feedstocks proceeds through several steps that involve the removal of water via the production of hydrocarbons followed by production of CO and H2. Those skilled in the art will recognize that depending on the conditions employed, other types of reactions such as dehydration and/or cracking type reactions may proceed in parallel to deoxygenation.

Most of the commercially available catalysts employed in steam reforming of hydrocarbons that are in use are nickel-based. Nickel-based catalysts are also used for gasification but are inferior in performance to the noble metals such as Ru and Rh. Catalytic reforming of hydrocarbons involves the dissociative adsorption of the hydrocarbon to the catalyst metal sites followed by metal catalyzed dehydrogenation. Water is also absorbed by the metal catalyst with the production of hydroxyl groups that are activated by increased temperature leading to the formation of carbon oxides.

The formation of carbon and its deposition on metal catalyst surfaces is an undesirable side reaction that leads to reduced catalyst efficiency, shortened catalyst life, and increased overall cost. Reduced fouling and increased efficiency of metal catalysts can be achieved by enhancing steam adsorption on the catalyst and/or the employment of other metals to assist in surface catalysis. Metal catalysts that can be used, for example, include magnesium, chromium, cobalt, and lanthanum (Garcia et al. 2000). Specific examples of these catalysts include $Ni/Al_2O_3$, $Ni/MgO$—$Al_2O_3$, $Ni/MgOLa_2O$, $Ni$—$Co/MgO$—$La_2O_3$-$Al_2O_3$, $Ni$—$Cr/MgO$—$La_2O_3$-$Al_2O_3$, $MgO$—$Al_2O_3$, and $MgO$—$La_2O_3$-$Al_2O_3$ (Garcia et al. 2000).

In addition to the choice of catalysts, it is important that the ratio of steam/carbon in feed (or "S/C") used is sufficient to drive the reaction to completion. A minimum S/C of 4 or greater is preferred.

Reforming oxygenated organics or hydrocarbons from lignocellulosics is best accomplished at high reactor throughputs while minimizing deactivation of catalyst and formation of non-volatile organic byproducts. In the past, fixed-bed commercial catalysts that contain Ni, K, Ca, and Mg on alumina support has been shown to be inferior to a fluidized bed configuration (French et al. 2002).

A fluidized bed configuration is not generally commercially practiced, because catalysts tend to show a decrease in reactivity with time. Catalyst inactivation can be reversed by regeneration either on or off line with resulting loss in efficiency and yield from this type of reactor design. Combining the best reactor configuration with high throughput, high S/C, high yield and productivity with inexpensive readily available catalysts remains an area of active research.

In another embodiment, the preparation of monomeric forms from C5 and C6 sugars is aided by enzyme treatment step that utilizes one or more of the following enzymes: α and gluco-amylases, mixture of C5 digesting enzymes consisting of xylanases, β-xylosidase, arabinosidase, cellobiase, β-glucosidase and other β-endo or exo-glucanases.

VI. Examples

The examples below are only representative of some aspects of the invention. It will be understood by those skilled in the art that processes as set forth in the specification can be practiced with a variety of alterations with the benefit of the disclosure. These examples and the procedures used therein should not be interpreted as limiting the invention in any way not explicitly stated in the claims.

Example 1

Production of Hydrogen Gas from Hydrolyzed, Extracted Corn Fiber

A hydrolyzed, extracted corn fiber is produced by obtaining corn fiber at a moisture level of between about 50% to about 70% by weight, then adding water if needed until the moisture level is about 70%. The 70% moisture corn fiber is placed in a sealed, rotating reactor. The reactor is then heated, for instance by using steam, to a temperature of between about 138° C. to about 150° C. That temperature is maintained for about 30 minutes to about 60 minutes. The reactor is then depressurized (if steam is used), and the corn fiber is dewatered. This dewatering is performed to remove an oligosaccharide-containing aqueous liquid from the mixture.

The oligosaccharide-containing mixture is about 35% glucose, about 4% galactose, about 33% xylose, about 27% arabinose, and about 1% other hexoses, with a ratio of hexoses to pentoses of about 4 to 6. This mixture is used as a starting material for vapor-phase reformation according to the process of Example 10 of Cortright, et al., U.S. Pat. No. 6,699,457, which has previously been incorporated herein by reference.

Patents, patent applications, publications, scientific articles, books, web sites, and other documents and materials referenced or mentioned herein are indicative of the levels of skill of those skilled in the art to which the inventions pertain. Each such referenced document and material is hereby incorporated by reference to the same extent as if it had been incorporated by reference in its entirety individually or set forth or reprinted herein in its entirety. Additionally, all claims in this application, and all priority applications, including but not limited to original claims, are hereby incorporated in their entirety into, and form a part of, the written description of the invention. Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, and the claims referred to above including but not limited to any original claims.

The inventions have been described broadly and generically herein. In addition, where features or aspects of an invention are described in terms of a Markush group, the invention shall be understood thereby to be described in terms of each and every, and any, individual member or subgroup of members of the Markush group.

As used herein and in the appended claims, the singular forms "a," "an," and "the" include plural reference unless the context clearly dictates otherwise. It shall be understood that, although the present invention has been specifically disclosed by preferred embodiments and optional features, modifications and variations of the inventions embodied therein or herein disclosed can be resorted to by those skilled in the art, and such modifications and variations are considered to be within the scope of the inventions disclosed and claimed herein.

Specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. Where examples are given, the description shall be construed to include but not to be limited to only those examples. It will be readily apparent to one skilled in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive. Thus, for example, additional embodiments are within the scope of the invention and within the following claims.

We claim:

1. A method for producing hydrogen from a plant source, comprising:
    obtaining a plant fiber material obtained by separating the fiber material from starchy material of an agricultural grain;
    if needed, adding water to bring the fiber material to a moisture level of about 70%;
    heating the fiber material in a sealed reactor to a temperature of between about 135° C. and 225° C. for about 30 to 60 minutes to form a heat and pressure treated plant fiber material;
    separating from the heat and pressure treated fiber material an aqueous liquid mixture containing oligosaccharides and a solids fraction;
    contacting the aqueous liquid mixture containing oligosaccharides with a catalyst at a temperature and pressure sufficient to decompose at least a portion of the oligosaccharides in the mixture to form a vapor mixture of gases including hydrogen; and
    separating hydrogen from other gases present in the vapor mixture.

2. The method of claim 1, wherein at least one of said agricultural grain is selected from the group consisting of corn, wheat, oats, rye, millet, barley, sorghum, triticale, and rice.

3. The method of claim 1 wherein said vapor mixture of gases includes carbon monoxide.

4. The method of a claim 1 wherein said catalyst is a metal-containing catalyst.

5. The method of claim 4, wherein said metal-containing catalyst comprises a metal selected from the group consisting of Group VIII transition metals, alloys thereof, and mixtures thereof.

6. The method of claim 4, wherein said metal-containing catalyst is selected from the group consisting of Ni/$Al_2O_3$, Ni/MgO—$Al_2O_3$, Ni/MgO$La_2O$, Ni—Co/MgO—$La_2O_3$—$Al_2O_3$, Ni—Cr/MgO—$La_2O_3$—$Al_2O_3$, MgO—$Al_2O_3$, and MgO—$La_2O_3$—$Al_2O_3$.

7. The method of claim 1 wherein the contacting is at a temperature of at least about 550° C.

8. The method of a claim 1 wherein the contacting is at a temperature of at least about 600° C.

9. The method of a claim 1 wherein the contacting is at a temperature between about 400 to about 600° C.

10. The method claim 1 wherein the contacting is at a pressure sufficient to maintain said vapor mixture of gasses as a condensed liquid.

11. The method of claim 1, further including treating said liquid mixture containing oligosaccharides with at least one enzyme selected from the group consisting of α-amylase, gluco-amylase, xylanase, β-xylosidase, arabinosidase, cellobiase, β-glucosidase, and other β-endo or exo-glucanases.

12. The process of claim 1 wherein the fiber material is corn fiber obtained at a moisture level of between about 50% to about 70 and heating the corn fiber comprises heating to a temperature of between about 138° C. and 150° C. for about 30 to 60 minutes to form the heat and pressure treated fiber material.

13. The process of claim 1 further including treating the separated solids fraction at temperature of about 550° C. or greater in the presence of a catalyst to obtain a syn gas comprising carbon monoxide and hydrogen.

14. The process of claim 1 further including treating the separated solids fraction at temperature of about 225-550° C. for a period of about 15 seconds to about 5 minutes to obtain a bio oil; and
    heating the bio oil to a temperature of at least about 550° C. or greater in the presence of a catalyst to obtain a syn gas comprising carbon monoxide and hydrogen.

15. The process of claim 14 wherein the separated solids fraction is heated to a temperature of about 450-550° C.

16. A method for producing hydrogen from plant fiber source, comprising:
    a. pressurizing an autoclave containing said plant fiber source, water and a catalyst with steam;
    b. heating said plant fiber source at a temperature of at least about 500° C. and pressure sufficient to convert said plant fiber source into an oligosaccharide containing aqueous liquid; and
    c. contacting said oligosaccharide containing aqueous liquid with a catalyst at a temperature and pressure sufficient to decompose said oligosaccharides to form hydrogen.

17. The process of claim 16 further comprising separating and collecting the hydrogen from a another gas formed therewith and associating indicia with the hydrogen that indicates the hydrogen is produced from a plant fiber source.

* * * * *